United States Patent

Breads

[11] 3,768,164
[45] Oct. 30, 1973

[54] METHOD OF MAKING A DENTAL APPLIANCE

[75] Inventor: Peter R. Breads, Buffalo, N.Y.

[73] Assignee: Great Lakes Orthodontic Laboratory Inc., Buffalo, N.Y.

[22] Filed: Oct. 26, 1972

[21] Appl. No.: 300,881

[52] U.S. Cl. .................................................. 32/2
[51] Int. Cl. ............................................ A61c 13/00
[58] Field of Search ................. 32/2, 13, 14 B, 14 C

[56] References Cited
UNITED STATES PATENTS
3,259,129  7/1966  Tepper ............................. 32/14 B
2,645,012  7/1953  Hetzel ................................. 32/2
2,616,175  11/1952  Buhler ............................... 32/2

Primary Examiner—Louis G. Mancene
Assistant Examiner—J. O. Lever
Attorney—Conrad Christel et al.

[57] ABSTRACT

A dental model formed from an impression taken from a patient's mouth is provided with anchoring wires at prescribed locations and then supported in a molding machine. The model is isolated or masked by surrounding it with small pellets of lead or other relatively dense material. An acrylic material in liquid form, a major constituent of which is methyl methacrylate, is applied to a selected portion of each wire, usually within the periphery of the model. Immediately thereafter a preheated sheet of thermoplastic material, a major constituent of which is methyl methacrylate, is applied to the model and shaped to conform thereto in a manner such that the selected portions of the anchoring wires are embedded in the plastic material. Upon cooling the resulting product, known as a retainer, is separated from the model.

12 Claims, 7 Drawing Figures

PATENTED OCT 30 1973 3,768,164
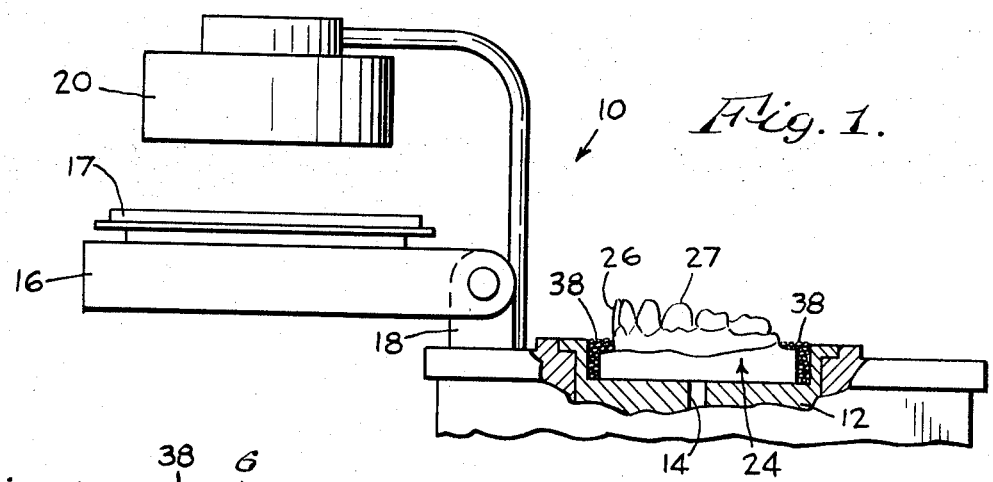
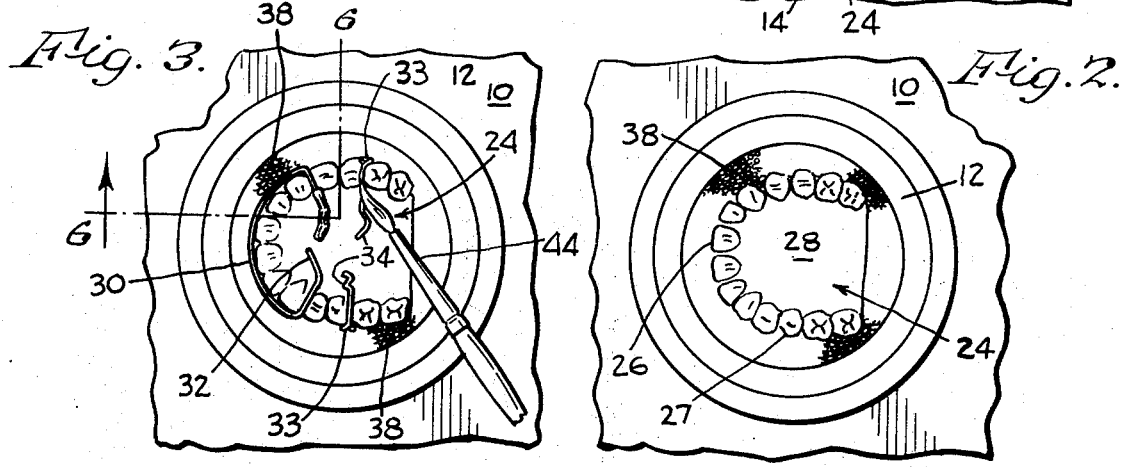
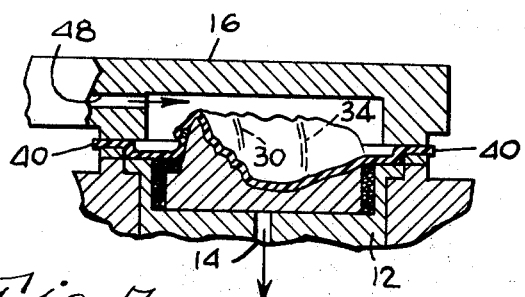
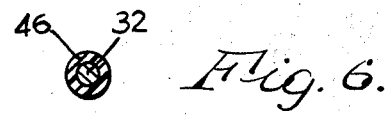
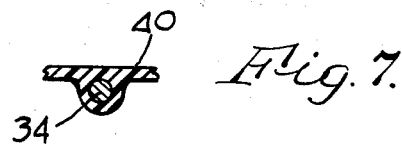
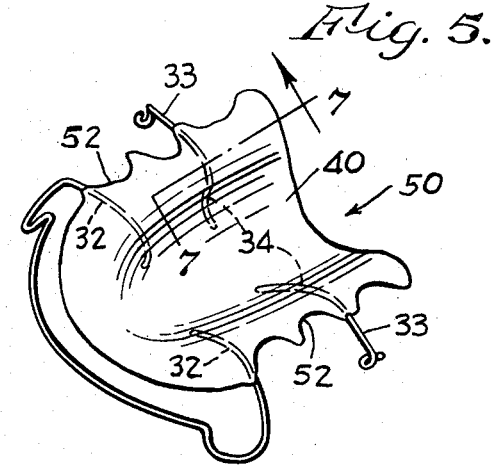

3,768,164

METHOD OF MAKING A DENTAL APPLIANCE

BACKGROUND OF THE INVENTION

This invention relates to the art of dentistry, and more particularly to a new and improved method of making a dental appliance.

One area of use of the present invention is in manufacturing dental and orthodontic appliances of the type having a plastic body portion from which anchoring wires extend although the principles of the invention can be variously applied. Appliances of this type include a plastic body portion shaped to fit a portion of a patient's mouth such as the palate, and wires secured at one end to the body portion and extending therefrom and shaped to engage the patient's teeth.

In making such devices there have been problems adequately securing the wires to the body portion, and one solution of the prior art is to position the ends of the wires between laminations of the plastic body before heat is applied to mold the plastic to the desired shape. Usually the ends of the wire are first cemented to one lamination before the other is placed on it. This procedure is relatively time consuming and requires a relatively thick plastic body portion which affects the cost of the appliance as well as comfort of the patient wearing the appliance.

SUMMARY OF THE INVENTION

It is, therefore, an object of this invention to provide a new and improved method of making a dental appliance of the type having a plastic body portion from which auxiliaries such as anchoring members extend.

It is a further object of this invention to provide such a method whereby ends of auxiliaries such as anchoring members are embedded in a unitary plastic body portion.

It is a further object of this invention to provide such a method wherein a dental model is supported during molding in a new and improved manner.

It is a further object of this invention to provide such a method which can be performed relatively quickly and economically and which produces a dental appliance of improved construction and quality.

The present invention provides a method of making a dental appliance wherein an auxiliary such as an anchoring member is positioned on a model formed from an impression taken from a patient's mouth, the model is supported, and a liquid material, a major constituent of which is methyl methacrylate, is applied to a selected portion of the anchoring member. Preheated thermoplastic material is applied to the model and to the liquid coated portion of the anchoring member, and the plastic is shaped to conform to the model in a manner whereby the selected portion of the anchoring member is embedded in the plastic material. The model is supported during molding by surrounding portions thereof not to receive plastic by relatively small pellets of lead or similar dense material. After molding and cooling the resulting product is separated from the model.

The foregoing and additional advantages and characterizing features of the present invention will become clearly apparent upon a reading of the ensuing detailed description together with the including drawing wherein;

BRIEF DESCRIPTION OF THE DRAWING FIGURES

FIG. 1 is a fragmentary elevational view, partly in section, of one form of apparatus used in performing the method of the present invention;

FIG. 2 is a fragmentary top plan view of the apparatus of FIG. 1;

FIG. 3 is a view similar to FIG. 2 and showing one step in the method of the present invention;

FIG. 4 is a fragmentary sectional view of the apparatus of FIG. 1 showing another step in the method of the present invention;

FIG. 5 is a perspective view of a dental appliance made by the method of the present invention;

FIG. 6 is a sectional view taken about on line 6—6 of FIG. 3; and

FIG. 7 is a sectional view taken about on line 7—7 of FIG. 5.

DETAILED DESCRIPTION OF THE ILLUSTRATED EMBODIMENT

A preferred form of apparatus used in performing the method of the present invention is illustrated in FIG. 1. The apparatus or machine 10 is operated, briefly, to heat preformed thermoplastic sheets or blanks to a soft state, place them over a model or form, and then apply air pressure to form the plastic to the contour of the model. Machine 10 includes, briefly, a cup-shaped receptacle 12 provided in the top surface of the body of machine 10 which receptacle is of a size sufficient to accommodate various sizes of dental models. A passage 14 connects receptacle 12 with a chamber (not shown) in device 10 for conducting air during the forming operation. Machine 10 further comprises a component 16 including a pressure chamber and a holder or frame 17 for holding blanks or sheets of thermoplastic material to be used in the method of the present invention. Component 16 is pivotally connected to a bracket 18 mounted on machine 10 whereby it can be moved from the position shown in FIG. 1 to a forming position placing a plastic blank over and onto the model as will be described in detail presently. Machine 10 further comprises a heater 20 in the form of a heater lamp for radiating heat onto the plastic blank held by component 16. Lamp 20 is swingably mounted on machine 10 so that it can be placed over the plastic blank held in component 16 and then moved out of the way to allow component 16 to be pivoted to a forming position. Machine 10 is provided with a control for regulating the operating pressure together with appropriate pressure indicators. A machine similar to that shown in FIG. 1 is available under the commercial designation BIOSTAR Dental Molding Machine from Great Lakes Orthodontic Laboratory, Inc., Buffalo, New York.

The method of the present invention is begun by providing a dental model 24 formed from an impression taken from the mouth of the patient. Model 24, also known in the art as a study model, is formed according to conventional procedures which are readily known to those skilled in the art so that a detailed description thereof is believed to be unnecessary. Suffice it to say, the dentist or orthodontist takes an impression of a patient's teeth by having the patient bite into a suitable material capable of retaining an impression and then this material is used as a mold to form model 24 of plaster or equivalent material. Model 24 thus provides a facsimile of the upper or lower jaw of a patient including front teeth 26, side teeth or molars 27 and a palatal surface portion 28 as shown in FIG. 2. It has been found advantageous to dampen the model and apply separating medium to the linqual surface thereof and to the palatal surface.

The next step in the method of the present invention is positioning auxiliaries or accessories such as anchoring members on model 24. In particular, an anchoring member 30 in the form of a wire is bent or formed according to specifications provided by the dentist or orthodontist and is positioned on the front part of model 24 in a manner such that a portion of wire 30 is on the facial surface or outer peripheral surface of model 24 and portions 32 of wire 30 are within the periphery of model 24. In particular, the portions 32 extend inwardly of the teeth and are adjacent the palatal portion 28 of the model. In the present example, two additional anchoring members or wires 33 are positioned on the opposite side portions of model 24, and each wire 33 has a portion 34 located adacent the palatal portion 28 of model 24. The anchoring members or wires 30, 33 are of a resilient material, preferably stainless steel. Wires 30, 33 are held in place by applying asbestos or a sticky wax substance over portions of the wires and the buccal surface or outer peripheral surface of model 24. The wire portions 32, 34 adjacent palatal portion 28 of model 24 are relatively close to palatal portion 28, often being in contact therewith.

Model 24 is supported during the remaining operations performed thereon, and in the present instance model 24 is placed in and supported by receptacle 12 of machine 10 so that the occlusal/incisal edge of model 24 is flush with or slightly above the top edge or surface of cup 12. According to the present invention, the region of receptacle 12 not occupied by model 24 is filled by relatively small-sized pellets 38 of relatively dense material, preferably lead, to isolate model 24. Pellets 38 are poured up to the top labial edge of the teeth of model 24 so as to be against the surfaces of model 24 which are not to receive plastic. In particular, pellets 38 serve to surround and support irregular shapes or surfaces which are encountered with model 24 and thereby serve to mask or isolate model 24 in receptacle 12. The use of pellets 38 protects the areas or surfaces of model 24 that are not to be covered with plastic during the forming operation, such as the undercuts in the labial and buccal portions of the model. This, in turn, enables model 24 to be removed from the plastic later on in a relatively easy manner. Overdrawing and undesirable thinning of the plastic from model 24 also is prevented. Pellets 38 can be provided up to a level adjacent the incisal edge of the teeth of model 24 so that the teeth do not become surrounded by the plastic material in the forming operation. While lead is preferred, pellets 38 can be of any other material having sufficient density so as not to be damaged under the temperature and pressure condition of the method of this invention whereby they can be used repeatedly.

The next step in the method of the present invention is heating a blank 40 of thermoplastic material. The thermoplastic material used in the method of the present invention is of the acrylic type having methyl methacrylate as a major constituent thereof. Blank 40 is positioned in component 16 of machine 10 and held therein by frame 17, and lamp 20 is swung into position over component 16 and operated at the required heating conditions. The heater 20 is operated at a maximum of 250 watts, and by way of example when thermoplastic blank or sheet 40 has a thickness in the range of 1.5 to 2.0 millimeters, a heating time of about 60 seconds is required. In many instances visual control of heating time is possible because various types of plastics exhibit visual indications of being ready for forming, such as slight dropping or surface flattening.

According to the method of the present invention, while the thermoplastic sheet or blank 40 is being heated, a liquid material having methyl methacrylate as a major constituent thereof is applied to a selected portion of the auxiliary member, in particular to the portion of the anchoring means within the periphery of model 24. As shown in FIG. 3, the liquid material is applied by means of a brush 44 or equivalent applicator such as a spatula to portions 32 of wire 30 and to the corresponding portions 34 of wires 33. For example, one of the portions 32 of wire 30 shown in FIG. 3 has liquid material 46. The liquid material has sufficient viscosity so that it clings to the wire, completely surrounding it, as illustrated in FIG. 6.

Material 46 is a synthetic polymerizable material of the rapid setting acrylic type, a major constituent of which is methyl methacrylate, and is commercially available under the designation "cold cure acrylic." The liquid material 46 may be compounded from one or more solid finely divided polymers and one or more liquid polymerizable monomers, the monomer portion of the composition forming at least a partial solvent for the polymer portion.

The next step in the method of the present invention is applying the heated thermoplastic material 40 to model 24 and shaping the plastic material to conform to the shape of the model. This is accomplished with machine 10 of FIG. 1 by swinging lamp 20 to a standby position and then moving component 16 about the pivot of bracket 18 to a position shown in FIG. 4 whereupon a pressure seal is effected and then air under pressure is introduced from a passage 48 to force plastic blank 40 against model 24 as shown in FIG. 4. When using a machine similar to machine 10 for forming a retainer from plastic material having a thickness of 1.5 to 2.0 millimeters, the operating pressure should be about four to five killograms per square centimeter. As an alternative to applying positive pressure against blank 40, molding could be performed by suction from the surface of blank 40 adjacent mold 24 thereby requiring that an aperture be provided in model 24 for withdrawing air between blank 40 and model 24. The plastic material is formed on model 24 in a manner whereby the portions 32 and 34 of wires 30 and 33, respectively, are embedded in the plastic material 40. Actually, other portions of the wires may be embedded in plastic 40 such as the portions contacting the teeth of model 24, but such excess plastic will be removed during a subsequent step. After the high pressure forming operation, the plastic is allowed to cool under pressure for an approximate time of at least two minutes.

The component 16 of machine 10 then is removed from the model 24 and moved back to the position of FIG. 1 whereupon model 24 and plastic 40 can be removed from receptacle 12 by hand. The plastic 40 containing embedded wires 30, 33 then is separated from model 24 by hand using a gentle finger force and working around the model. If themodel was properly positioned in receptacle 12 and the undercut surfaces properly masked or isolated with the lead pellets 38, the plastic will release easily. A suitable cutting tool is used to trim the excess plastic by following the impression made therein by the inner surfaces of the teeth. When trimming is done near wires 30, 34 it should be done only up a distance of about one-half millimeter from the wires, and then the remaining plastic can be broken easily to free the wire. The portion of the finished product which was in contact with mold 24 is coated with a resinous liquid in the form of acrylic resin solution marketed under the tradename Acrypol by Scheu-Dental of West Germany. This imparts a high gloss finish to the surface. This same liquid can be applied to the edge of the product for finishing the same.

In the method of the present invention liquid material 46 serves as an intermediary between the relatively hot plastic material 40 and the relatively cold auxiliaries such as anchoring wires 30, 33 during the forming and shaping operation. As the heated plastic material 40 is applied to wires 30, 34 and mold 24, the liquid material serves as a vehicle to enable the plastic material to wrap itself around or surround the wires during the forming and shaping operation. The liquid material and the plastic have a common basis or characteristic in that both include methyl methacrylate in a substantial amount. As a result, the selected portions of the wires 30, 34 are completely embedded in the plastic material. The liquid material is applied to the accessories while the plastic material 40 is being heated by machine 10, and it is important that the heated plastic material be applied to model 24 and the auxiliaries before the liquid material begins to cure. The fact that wires 30, 33 can be completely embedded in a relatively thin, single sheet of plastic material provides a relatively strong and effective device which is made by a method which is performed relatively quickly and easily. The pellets 38 of lead or similar relatively dense material not only protect or mask those surfaces of model 24 to which plastic is not to be applied so as to facilitate separation of the model and plastic but also have the advantage that they can be used repeatedly.

FIG. 5 shows a finished device 50 formed by the method of the present invention. Device 50 is known in the art as a retainer and is used passively for retaining the teeth positions or actively for modifying the position of certain teeth. The shape of plastic body portion 40 matches the palate of the patient and the edge 52 of portion 40 matches the contour of the teeth. The device 50 is held in place by the natural adhesion between the device and the palate with the interposition of a film of saliva. The auxiliaries such as wires 30, 33 apply force to the teeth by virtue of their configuration and resiliency.

The device 50 formed by the method of the present invention has a relatively thin plastic body portion 40 which is unitary or integral. By way of example, the thickness of plastic body portion 40 is in the range of from about 2.0 millimeters to about 0.5 millimeters depending upon the original thickness of the particular sheet or blank used. The ends of the wires 30, 33 are effectively secured in plastic body 40 in that they are completely embedded therein. The device 50 in having a relatively thin and unitary plastic body portion wears comfortably and is relatively economical to manufacture since the method can be performed quickly and easily. The device 50 functions effectively and has a relatively long wear life due to the embedding of wires 30, 33 in plastic body portion 40. While the method of the present invention has been described in connection with forming device 50 it can be extended to forming retainers having screws, separators, springs or nametags in the plastic body portion in which case the liquid material is applied to these accessories in the same manner as it is applied to the anchoring wires.

It is therefore apparent that the present invention accomplishes its intended objects. While a single embodiment of the present invention has been described in detail, this is for the purpose of illustration, not limitation.

What is claimed is:

1. A method of making a dental appliance comprising:
   a. providing a dental model formed from an impression taken from the mouth of a patient;
   b. positioning an auxiliary member on said model;
   c. supporting said model;
   d. applying a liquid material having methyl methacrylate as a major constituent thereof to a selected portion of said auxiliary member;
   e. applying heated thermoplastic material to said model and shaping said plastic material to conform to the shape of said model; and
   f. cooling said plastic material.

2. A method according to claim 1, wherein said auxiliary member comprises an anchoring wire which is positioned so that a portion is adjacent the palatal portion of said model and wherein said liquid material is applied to said portion of said wire adjacent said model palatal portion.

3. A method according to claim 2, wherein a plurality of anchoring wires are positioned on said model, each wire having a portion adjacent the palatal portion of said model, and wherein said liquid material is applied to each of said wire portions adjacent said model palatal portion.

4. A method according to claim 1, wherein said model is supported by placing a plurality of relatively small pellets of a relatively dense material against surfaces of said model not to receive plastic.

5. A method according to claim 4, wherein said pellets are of lead.

6. A method according to claim 4, wherein said model is placed in an open top receptacle with the top edge of the teeth of said model approximately flush with the top of said receptacle and wherein said pellets are placed in said receptacle around said model and below the top edge of the teeth thereof.

7. A method according to claim 1, wherein said heated plastic material is applied to said model before said liquid material on said auxiliary member begins to cure.

8. A method according to claim 1, wherein said thermoplastic material has methyl methacrylate as a major constituent thereof.

9. A method according to claim 1, wherein said thermoplastic material is applied to said model and shaped in a manner embedding said selected portion of said auxiliary member in said plastic material.

10. A method according to claim 1, further including separating the resulting product from the model and removing any excess plastic therefrom.

11. A method according to claim 10, further including applying a coating of a resinous liquid to the surface of said product which was in contact with said model to finish said surface.

12. A dental appliance obtained by the method of claim 1.

* * * * *